Feb. 25, 1941.   C. H. MURRAY ET AL   2,233,177
CONTROL FOR ELECTRIC WELDING APPARATUS
Filed July 14, 1938   2 Sheets-Sheet 2

Inventors:
Clifford H. Murray
Herbert A. Trussell
By Owen W. Kennedy
Attorney

Patented Feb. 25, 1941

2,233,177

UNITED STATES PATENT OFFICE 2,233,177

CONTROL FOR ELECTRIC WELDING APPARATUS

Clifford H. Murray and Herbert A. Trussell, Worcester, Mass.

Application July 14, 1938, Serial No. 219,250

3 Claims. (Cl. 171—97)

The present invention relates to electric welding apparatus, and has for its object to provide an improved arrangement for accurately controlling the flow of current in electric welding operations, particularly spot welding.

According to the present invention, there is provided an improved control arrangement, simple and effective in operation, whereby the duration of the flow of alternating current to the welding electrodes can be regulated over a wide range, running from a portion of a cycle to any desired number of cycles of an alternating current wave. The control devices employed for carrying out the invention are driven in synchronism with the frequency of the alternating current source which supplies the welding circuit, and the invention contemplates the provision of suitable adjustments of the control apparatus which can be quickly and conveniently made, to obtain the desired welding effects when operating on work employing different metals of varying thicknesses. The above and other advantageous features of the invention will hereinafter more fully appear from the following description considered in connection with the accompanying drawings, in which—

Figure 1:
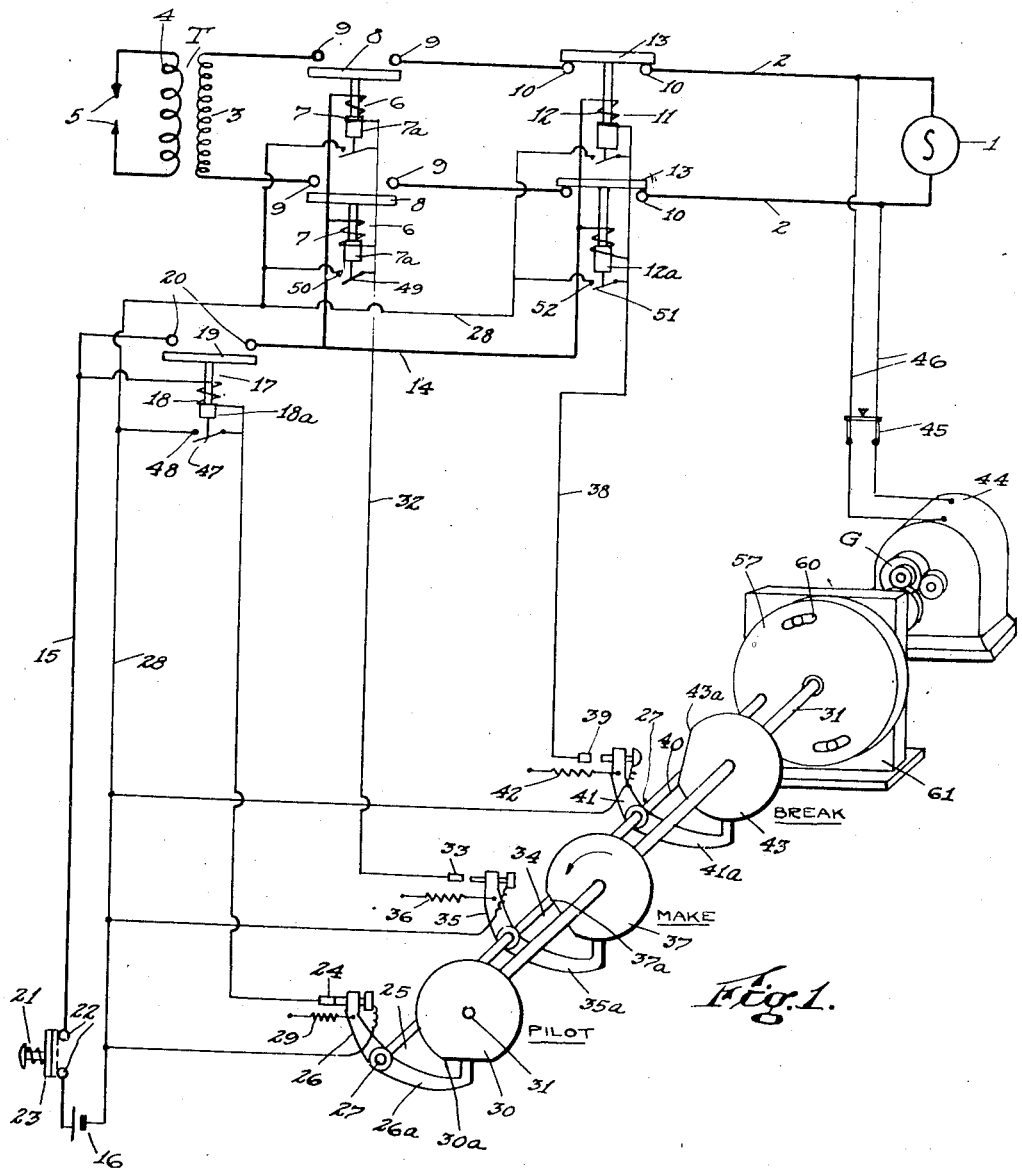
Fig. 1 is a diagrammatic view, illustrating the control arrangement and the circuit connections associated therewith.
Figure 2:
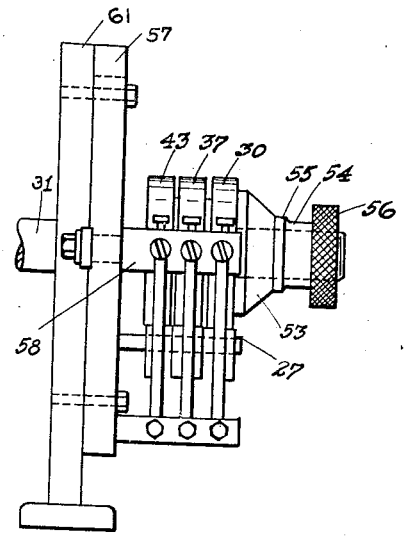
Fig. 2 is a view in side elevation of the motor-driven apparatus illustrated diagrammatically in Fig. 1.

Referring to Fig. 1, a source 1 of alternating current is provided to energize a welding circuit, comprising conductors 2 leading to the terminals of the primary winding 3 of a welding transformer T. The transformer T provides a secondary winding 4, the terminals of which are connected to the welding electrodes 5, in the usual manner.

For the purpose of connecting the terminals of the primary winding 3 to the power conductors 2, a pair of contactors 6 are provided that are identical in construction, and in operation. Each contactor 6 provides an operating winding 7 and a bridging member 8 which, when the winding 7 is energized, serves to close the gap between a pair of normally open contacts 9. One contact 9 of each pair is connected to the terminal of the primary transformer winding 3, while the other contact 9 is connected to the power conductors 2 through the normally closed contacts 10 of contactors 11.

The contactors 11 are for the purpose of disconnecting the transformer winding 3 from the power conductors 2, and are identical in construction and in operation. Each contactor 11 provides an operating winding 12 and a bridging member 13, that normally extends across the gap between the contacts 10, when the winding 12 is deenergized. Therefore, with both pairs of contactors 6 and 11 deenergized, prior to a welding operation, there exist gaps in the circuit of the primary winding at the open contacts 9, and separate means for creating additional gaps, at contacts 10, in the circuit of the winding 3, when the contactors 6 are closed.

One terminal of each of the several contactor windings 7 and 12 is connected to a common conductor 14, that is adapted to be connected to a supply main 15, energizable from one side of a suitable direct current source 16. For the purpose of energizing the conductor 14, a contactor 17 is provided, comprising a winding 18, and a bridging member 19 normally out of engagement with spaced stationary contacts 20 when the winding 18 is deenergized. One contact 20 is connected to the conductor 14 leading to the contactor windings 7 and 12, while the other contact 20 is connected to the direct current supply main 15. The supply main 15 is adapted to be connected to the direct current source 16 by a switch 21, shown as providing normally open spaced contacts 22, engageable by a bridging member 23 only when the switch 21 is operated to bring about a welding operation, under the automatic control of apparatus which will next be described.

One terminal of the winding 18 of contactor 17 is connected to the supply main 15, while the other terminal thereof is connected to a stationary contact 24, forming part of a make-and-break device, generally designated by the reference character 25. The device 25 also comprises an arm 26, pivoted on a shaft 27, with the arm 26 electrically connected to a supply main 28, energized from the opposite side of the direct current source 16, from which the main 15 is adapted to be energized. A spring 29 tends to turn the arm 26 in the direction of the stationary contact 24, and the engagement or disengagement of the arm 26 with contact 24, depends upon the cooperation between an extension 26a of the arm 26 and a control element 30, rotatably mounted on a shaft 31.

The control element 30 is in the form of a disk, and when the end of the arm extension 26a is riding on the circular portion of the element, the opposite end of arm 26 is maintained out of engagement with the contact 24, against the pull of spring 29. However, when the arm extension 26a bears on a flat portion 30a of the control member 30, the spring 29 engages the arm 26 with the contact 24, to connect one terminal of the contactor winding 18 with the supply main 28. However, the engagement of arm 26 with contact 24, will not energize the contactor 17, unless the switch 21 has previously been closed for the performance of a welding operation, and the main 15 thereby energized.

As previously pointed out, one terminal of each of the windings 7 of contactors 6 is connected to the common conductor 14, and the other terminals of these windings are connected to a common conductor 32 leading to a stationary contact 33, forming part of a make-and-break device 34, associated with the device 25. The device 34 provides an arm 35, pivotally mounted on the same shaft 27 carrying the arm 26, and a spring 36 tends to move the end of arm 35 in the direction of contact 33. A second control element 37, also mounted on the shaft 31, is in the form of a disk cooperating with an extension 35a of arm 35, to maintain the other end of the arm out of engagement with the contact 33. The control element 37 provides a flat portion 37a which, when engaged by the arm extension 35a, permits the spring 36 to engage the arm 35 with stationary contact 33, to connect one terminal of each contactor winding 7 with the continuously energized direct current supply main 28. However, engagement of the contact 33 by arm 35 will not energize the windings 7, unless at that moment the conductor 14 is energized by closure of contactor 17, under the control of element 30.

One terminal of each of the windings 12 of the contactors 11 is connected by a conductor 38 to a stationary contact 39 forming part of a make-and-break device 40, cooperating with the previously described devices 25 and 34. This device 40 provides an arm 41, also mounted on the shaft 27 and connected to the supply main 28, with a spring 42 tending to turn the arm 41 toward the contact 39. An extension 41a of the arm 41 cooperates with a third control element 43, mounted on the shaft 31, with the circular portion of the element 43 serving to maintain the arm 41 out of engagement with stationary contact 39. However, when the extension 41a engages a flat portion 43a on the element 43, the spring 42 engages the opposite end of arm 41 with the contact 39, to connect one terminal of each of the contactor windings 12 with the direct current supply main 28. It is evident that such engagement will not energize the contactors 11, unless at that moment the contactor 17 is closed.

The shaft 31 carrying the three control elements 30, 37 and 43, is driven through suitable gearing G by a synchronous motor 44 connected directly across the alternating current power conductors 2 by a switch 45 and leads 46, so that the motor 44 is continuously operating in exact synchronism with the alternating current source 1. As previously pointed out, successive operation of the make-and-break devices 25, 34 and 40 by the control elements 30, 37 and 43, respectively, will not operate the contactors 17, 6 and 11, unless the switch 21 has previously been closed, to energize the main 15. While obviously the switch 21 can be closed at any time during the revolution of the motor shaft 31, it will be assumed for the purposes of the following description of the operation, that the switch 21 has been moved to the dotted line position when the three control elements mounted on the shaft 31 occupy the angular relation shown in Fig. 1, so as to bring about a sequence of operations effective to cause the flow of welding current between the electrodes 5, as will next be described.

With the operator's switch 21 closed, rotation of the control shaft 31 in the direction of the arrow, to bring the parts into the position of Fig. 1, causes the arm 26 to engage contact 24, as arm extension 26a bears on the flat portion 30a of the control element 30. When this occurs, the winding 18 of the contactor 17 is connected across the direct current supply mains 15 and 28, thereby causing the bridging member 19 to engage contacts 20. As the arm 26 passes off of the flat portion 30a, the circuit of the winding 18 is broken at the contact 24, but the previous upward movement of the bridging member 19 has established a holding circuit for the winding 18. For this purpose, a switch arm 47, connected to the terminal of the winding 18 leading to the contact 24, is operable by the contactor plunger 18a, and normally, this arm 47 is out of engagement with a stationary contact 48 connected to the main 28. Therefore, when energization of the winding 18 by the control element 30 causes the plunger 18a carrying the bridging member 19 to pull up to the dotted line position, the arm 47 engages contact 48, and establishes a holding circuit for the winding 18 that is maintained as long as the switch 21 remains closed.

Continued rotation of the shaft 31 from the position of Fig. 1, causes the arm 35 to engage the contact 33 as the arm extension 35a bears on the flat portion 37a of the control element 37. When this occurs, a circuit is established from the main 28 through the conductor 32 to one terminal of each of the contactor windings 7. Since the other terminals of these windings are connected to the then energized conductor 14, both contactors 6 pull up, to cause their members 8 to bridge the respective pairs of contacts 9, in circuit with the power conductors 2. Closure of the contacts 9 therefore energizes the primary winding 3 of the transformer T, whereupon welding current flows between the electrodes 5, for a period determined by the angular relation between the control elements 37 and 43, as will be hereinafter pointed out.

With the parts occupying the position of Fig. 1, and with the shaft 31 rotating in the direction of the arrow, it is evident that the control element 43 will cause the arm 41 to engage the contact 39 a predetermined time after the arm 35 engages the contact 33, to energize the contactors 6. When the contact 39 is so connected to the main 28, the resulting energization of the windings 12 of both contactors 11, causes the bridging members 13 to leave the contacts 10, thereby breaking the circuit from the power conductors 2, and interrupting the flow of welding current as the transformer T is disconnected from the source 1.

In order to prevent the contactors 6 from opening, as the arm extension 35a passes off the flat 37a, the plunger 7a of each winding 7 operates a contact arm 49 that is connected to the same terminal of the winding 7 that leads to the contact 33. Normally, this arm 49 is out of engagement with a stationary contact 50 connected to the main 28, but upon pulling up of the bridging member 8 by plunger 7a, a holding circuit for the winding 7 is established, which is maintained as long as the switch 21 and contactor 17 remain closed.

Each contactor 11 provides a similar interlock arm 51 connected to one terminal of the winding 12 leading to the contact 39, and normally maintained by the plunger 12a out of engagement with a stationary contact 52 connected to the main 28. Therefore, engagement of the arm 51 with the contact 52, upon pulling up of the bridging member 13, establishes a holding circuit for each winding 12, which is maintained as long as the switch 21 and contactor 17 remain closed.

From the foregoing, it is apparent that following the closure of switch 21, the first complete revolution of the control shaft 31 will result in successive operation of the contactors 17, 6 and 11 in the order named, to bring about a flow of alternating current between the welding electrodes, for a period determined by the angular relation between the control elements 37 and 43. However, continued rotation of the shaft 31, with the switch 21 still closed, will not result in any further flow of welding current due to the flow of current through the contactor windings 12, by reason of the closure of the interlock contacts 51 and 52, as pointed out above. That is to say, as long as the contactors 11 remain energized to maintain the main line contacts 10 open, the welding cycle cannot be repeated, even though the switch 21 remains closed through several revolutions of the control shaft 31.

Therefore, in order to obtain a second sequence of operations by the contactors 17, 6 and 11 and cause another weld, it is first necessary to open the switch 21, whereupon all the contactors become deenergized through disconnection of the main 15 from the source 16. The control system is thereby restored to its normal non-operating condition, in readiness to perform another welding operation, upon reclosure of the switch 21, at the will of the operator.

Figure 3:
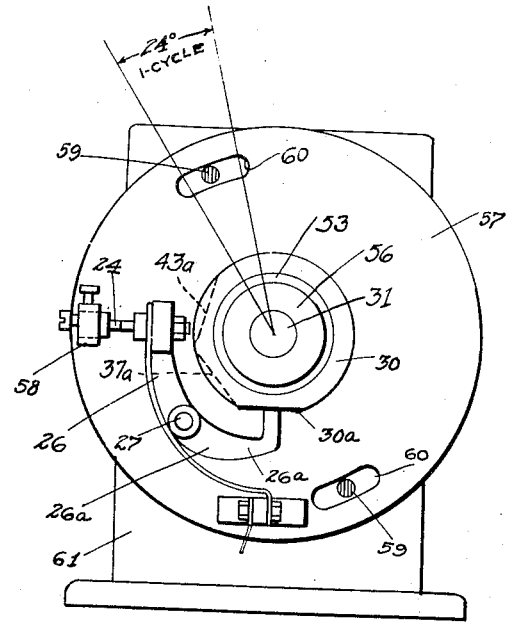
Fig. 3 is a view in front elevation of the parts shown in Fig. 2.
Figure 5:
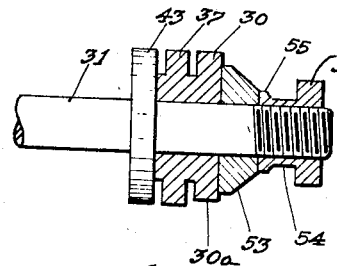
Fig. 5 is a fragmentary sectional view along the line 5—5 of Fig. 3.
Figure 4:
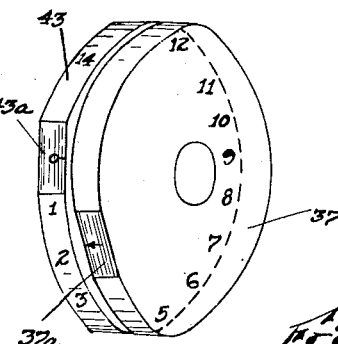
Fig. 4 is a schematic diagram, illustrating adjustment of the welding period.

As previously pointed out, the invention contemplates the provision of suitable adjustments of the control apparatus described above, whereby the period of time during which welding current flows, may be accurately varied over a wide range, and one way of obtaining such adjustments is shown in Figs. 3 and 5. For this purpose, the shaft 31 leading from the motor-driven reduction gearing G, has the control elements 30 and 37 adjustably mounted thereon with a fixed angular relation between them, so that the pilot contactor 17 is always closed an appreciable interval in advance of energization of the circuit making contactors 6, to start the welding current. But the third control element 43, which operates the circuit breaking contactors 11 to interrupt the welding current, is fixed on the shaft 31. In order to regulate the duration of the flow of welding current, provision is made for varying the angular relation between elements 43 and 37, to which end a clamping ring 53 is mounted on the shaft 31, and a nut 54 threaded onto the end of the shaft 31, provides a shoulder 55 bearing on the ring 53, see Fig. 5. The nut 54 provides an enlarged knurled portion 56, whereby it may be readily turned by hand, to tighten the clamping ring 53 and hold the element 37 in position after an adjustment has been made with respect to element 43.

Provision is also made for the relative adjustment between the make-and-break device 40 and the control element 43, so as to insure that the contactors 11 will operate to open the circuit of the primary transformer winding 3 at substantially the zero point on the current wave of a cycle of alternating current. To this end, the shaft 27 carrying the several arms of the make-and-break devices, is mounted on a disk 57, through which the shaft 31 freely passes. The several stationary contacts 24, 33 and 39, are also supported on the disk 57 by means of a bar 58, from which the several contacts are insulated. The disk 57 is supported so as to be angularly adjustable about the axis of the shaft 31 by diametrically opposed bolts 59 extending through slots 60 equidistant from the axis of the shaft 31, and each having a center of curvature at the axis. The bolts 59 are threaded into a stationary bracket 61, so that the disk 57 carrying the make-and-break devices may be angularly adjusted with respect to the shaft 31, to closely determine the instant at which the arm 41 engages the contact 39, to energize the contactors 11 and interrupt the welding current.

As previously pointed out, reduction gearing G is interposed between the motor and the control shaft 31, and the ratio of this gearing is chosen so that the length of each adjusting slot 60 substantially corresponds to the angle through which the shaft 31 is turned during a complete alternating current cycle. For example, assuming that the alternating current source 1 is operating at 60 cycles, so that the synchronous motor is running at 3600 R. P. M., a reduction through the gearing G of 15 to 1, will drive the shaft 31 at 240 R. P. M., or 4 revolutions per second. Therefore, the shaft 31 will be turned through 1440 angular degrees per second, or at the rate of 24° for each cycle of alternating current. Using the above figures for purposes of illustration, it is evident then that with each slot 60 laid out to subtend an angle of approximately 24°, it will be possible to find and maintain an angular position of the disk 57, at which the arm 41 will engage the contact 39 so as to open the welding circuit substantially at the zero point of an alternating current wave, with a consequent reduction of arcing at the contacts 10 to a minimum.

Assuming that the disk 57 has been set and clamped by means of the bolts 59, so as to assure opening of the welding circuit at the zero point of the current wave, it is then an easy matter to adjust the element 37 with respect to the element 43, to obtain the desired duration of the flow of welding current. As previously pointed out, each 24° of control shaft displacement corresponds to the duration of one cycle of current, assuming a gear reduction of 15 to 1, and a 60 cycle source. Therefore, by varying the angular position of control element 37 with respect to the element 43, which is fixed on the shaft 31, the duration of the flow of welding current can be varied from a portion of an alternating current cycle to several cycles. With an angular displacement between the flat portions 37a and 43a of approximately 48°, as shown in Fig. 1, it is evident that the welding current will flow through the duration of approximately two alternating current cycles. Obviously, this duration of welding current can be diminished to a fraction of a cycle, by turning the element 37 against the direction of rotation of the shaft 31, or the duration of welding current flow can be carried through several cycles, by turning the element 37 in the direction of control shaft rotation. If desired, the peripheral edge of the fixed element 43 may be calibrated in terms of the number of cycles of current flow, with reference to a zero mark passing through the middle of the flat portion 43a, so that a pointer at the middle of the flat portion 37a on element 37 will show the adjustment.

It is to be noted that the figures given above are purely arbitrary, being based on the assumption of a given gear reduction between the shaft of motor 44 and the control shaft 31, and obviously, the particular angular displacement of the control shaft 31, corresponding to the duration of an alternating current cycle, can be increased or decreased as desired, by varying the gear ratio.

With the duration of welding current flow closely adjustable over a wide range, as described above, it is evident that the apparatus of the present invention is adapted to control the electric welding of different kinds of material of varying thicknesses. That is to say, the welding period can be cut down to a small fraction of a cycle, such as $\frac{1}{120}$ or $\frac{1}{240}$ of a second, as when welding very thin sheets of stainless steel, where the welding heat must be reduced to avoid deterioration of the metal. On the other hand, the welding period can be increased to extend through as many as fourteen cycles, with the figures given, so as to give a current flow of approximately ¼ of a second, as when welding sheets of thick metal, such as boiler plate.

In order to obtain very close adjustment of the several make-and-break devices 25, 34 and 40, each of the stationary contacts 24, 33 and 39 is micrometrically adjustable within the bar 58, as shown in Fig. 3, thereby making it possible to accurately time engagement or disengagement of the arms 26, 35 and 41, with the contacts 24, 33 and 39 under the control of elements 30, 37 and 43, respectively.

From the foregoing, it is apparent that by the present invention there is provided an improved control arrangement, whereby the duration of the flow of alternating current to welding electrodes can be quickly and conveniently varied over a wide range, running from a portion of an alternating current cycle to any desired number of cycles, to suit the character of the metal work being welded. While in the drawings only one set of electrodes is shown under the control of a set of timing elements and contactors, obviously, the control shaft 31 can be extended to carry additional sets of control elements, each adapted to regulate the flow of current through separate welding electrodes, independently of each other. By the employment of separate contactors to make and break the circuit of the welding transformer, extremely positive control of the flow of welding current is obtained, while the automatic functioning of the interlocking contactor circuits makes it impossible for the welding cycle to be repeated, except by opening and reclosing the operator's switch 21. If desired, the switch 21 could be automatically closed and opened at fixed intervals to give regular spacing of welds, as is customary in seam welding.

We claim,

1. In combination, a circuit to be controlled, a source of alternating current, a synchronous motor continuously energized from said source, a control device rotatively driven by said motor comprising pairs of relatively movable contacts adapted to be successively closed and quickly opened once during each complete revolution of said control device, a relay providing normally open contacts in said circuit, a second relay providing normally closed contacts in said circuit, connections between the control contacts and relays for successively energizing said relays to close the contacts of the first relay and to open the contacts of the second relay, after a predetermined period of current flow from the source measured in terms of alternating current cycles, and additional connections for maintaining said relays in an energized condition, independently of said control contacts, to limit the flow of current in said circuit to a single period, irrespective of the continued rotation of said control device by said motor.

2. In combination, a circuit to be controlled, a source of alternating current, a synchronous motor continuously energized from said source, a control device rotatively driven by said motor comprising pairs of normally open contacts adapted to be momentarily closed in succession during each complete revolution of said control device, a relay providing normally open contacts in said circuit, a second relay providing normally closed contacts in said circuit, connections between the control contacts and relays for successively energizing said relays to close the contacts of the first relay and to open the contacts of the second relay, after a period of current flow from the source measured in terms of alternating current cycles, means for adjusting said control device to vary the interval between the closing and opening of the relay contacts over a predetermined number of alternating current cycles, or portions of cycles, and additional connections for maintaining said relays in an energized condition independently of said control contacts to limit the flow of current in said circuit to a single period, in accordance with the adjustment of said control device and irrespective of the continued rotation thereof by said motor.

3. In combination, a circuit to be controlled, a source of alternating current, a synchronous motor continuously energized from said source, a control device rotatively driven by said motor comprising pairs of normally open contacts adapted to be momentarily closed in succession during each complete revolution of said control device, a relay providing normally open contacts in said circuit, a second relay providing normally closed contacts in said circuit, connections between the control contacts and relays for successively energizing said relays to close the contacts of the first relay and to open the contacts of the second relay, after a period measured in terms of alternating current cycles, a third relay providing normally open contacts in the energizing circuits of the first and second relays, connections between the control contacts and said third relay for closing its contacts in advance of operation of the other relays, and additional connections for maintaining all of said relays in an energized condition independently of said control contacts, to limit the flow of current in said circuit to a single period, irrespective of the continued rotation of said control device by said motor.

CLIFFORD H. MURRAY.
HERBERT A. TRUSSELL.